July 12, 1949.    M. R. JESKE    2,475,967
SHAFT PACKING
Filed May 21, 1946
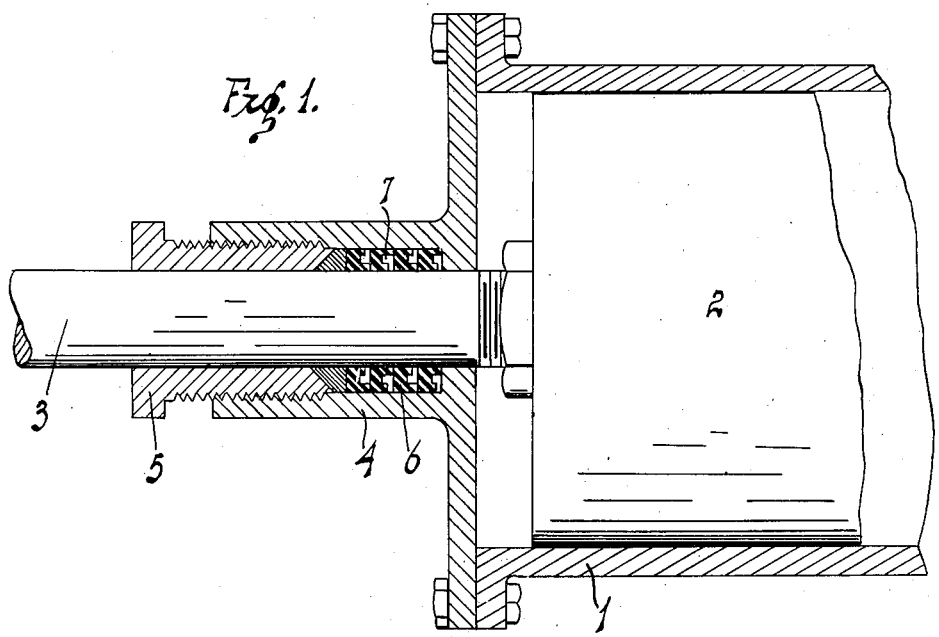
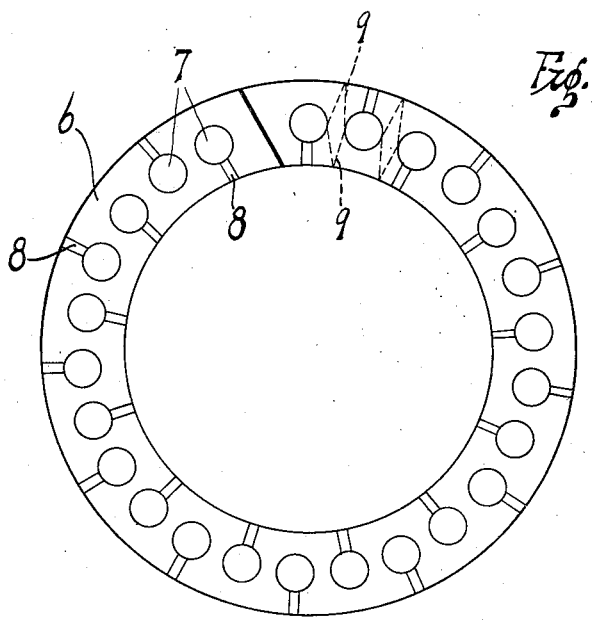
INVENTOR.
Martin R. Jeske.
BY
ATTORNEY.

Patented July 12, 1949

2,475,967

UNITED STATES PATENT OFFICE 2,475,967

SHAFT PACKING

Martin R. Jeske, Long Beach, Calif.

Application May 21, 1946, Serial No. 671,143

1 Claim. (Cl. 288—4)

This invention relates to a shaft packing and is particularly applicable to rotating shafts, although a reciprocating shaft may also be packed with the same structure, if desired.

An object of my invention is to provide a novel shaft packing, in which means is provided to expand the packing against the shaft and the packing gland, the expansion of the packing being accomplished through the pressure of the fluid circulated by the pump, or the like.

Another object of my invention is to provide a novel shaft packing of the character stated, in which less gland pressure is required, and therefore there is a reduced friction on the shaft or rod which extends through the packing.

Still another feature of my invention is to provide a novel packing of the character stated which will not flow to the bottom of the gland under use, but which will maintain its original position and shape in the gland over a long period of time.

Still another object is to provide a novel shaft packing in which both the inner and outer peripheries of the packing will be pressed against the shaft and gland respectively by hydraulic pressure.

Other objects, advantages and features of invention may appear from the accompanying drawing, the subjoined detailed description, and the appended claim.

In the drawing

Figure 1 is a fragmentary longitudinal sectional view of a pump showing my packing mounted therein.

Figure 2 is a side elevation of my packing.

Referring more particularly to the drawing, the numeral 1 indicates a pump, or the like, comprising a piston 2, and a shaft 3. The shaft 3 extends through a gland 4 and the usual nut 5 is provided to hold the packing in position, and to compress this packing as is necessary, all of which is usual and well known in the art. My shaft packing 6 may be either in the form of a coil or a spiral, and in either event the desired lengths of packing are cut from the original coil or spiral.

A plurality of circumferentially spaced holes 7 are provided in one face of the packing 6. These holes extend inwardly a substantial distance, but less than the full thickness of the packing. In other words, they do not go entirely through the packing.

A groove 8 extends into each of the holes 7, and these grooves alternate, there being one from the inner periphery of the packing, while the next one extends from the outer periphery of the packing. The purpose of these grooves is to permit hydraulic pressure to pass from either around the shaft 3 or within the gland 4, and thence into the respective holes 7.

Hydraulic pressure within the spaced holes 7 will expand the packing both outwardly and inwardly, thus effectively sealing the shaft 3, and preventing leakage. Pressure in the holes 7 will be exerted both outwardly and inwardly, approximately in the form of a cone, these pressure areas being shown with dotted lines in Figure 2, and indicated at 9.

It will be evident that the pressure areas of adjacent holes will somewhat overlap at both the outer and inner edges of the packing, thus providing a continuous pressure over the entire outer and inner peripheries. The holes 7 will be circumferentially spaced so that the pressure areas in the peripheries of the packing will overlap or will be continuous.

The gland nut 5 need not be tightened against the packing to any great extent, and consequently the packing will not flow to the bottom of the gland as is usual in packings heretofore used.

The fluid under pressure is trapped in the holes 7 and therefore there is constant pressure within the packing, which tends to maintain the packing as to size, that is, the packing will not appreciably compress. As a result of this action, there is no compression of the packing and there will be no flow towards the bottom of the gland.

Having described my invention, I claim:

A shaft packing comprising a ring like body, said body having a plurality of circumferentially spaced holes extending partially therethrough and from one face thereof, said holes being spaced from the inner and outer peripheries of the body, said body having a groove extending through each of said holes, said grooves alternately extending from the inner and outer peripheries of the body.

MARTIN R. JESKE.

REFERENCES CITED

The following references are of record in the file of this patent:

UNITED STATES PATENTS

| Number | Name | Date |
|---|---|---|
| 872,169 | Clayton | Nov. 26, 1907 |
| 2,007,501 | Millmine | July 9, 1935 |